United States Patent [19]

Minoura

[11] Patent Number: 5,320,227
[45] Date of Patent: Jun. 14, 1994

[54] BICYCLE STAND

[75] Inventor: Koji Minoura, Gifu, Japan

[73] Assignee: Minoura Co., Ltd., Gifu, Japan

[21] Appl. No.: 998,395

[22] Filed: Dec. 23, 1992

[30] Foreign Application Priority Data

Nov. 9, 1992 [JP] Japan .................. 4-298955

[51] Int. Cl.⁵ .............................................. A47F 7/00
[52] U.S. Cl. ...................................... 211/22; 248/122; 248/166
[58] Field of Search ............. 248/122, 125, 150, 151, 248/166, 170, 439; 211/22, 17

[56] References Cited

U.S. PATENT DOCUMENTS

| | | | |
|---|---|---|---|
| 2,194,800 | 3/1940 | Ley | 248/166 X |
| 3,981,491 | 9/1976 | Snyder | 269/243 X |
| 4,807,837 | 2/1989 | Gawlik et al. | 248/125 |
| 4,813,550 | 3/1989 | Saeks | 211/22 X |
| 4,923,156 | 5/1990 | Linnelisson | 248/170 |
| 4,988,064 | 1/1991 | Hoshino | 248/170 |
| 5,083,729 | 1/1992 | Saeks et al. | 211/22 |
| 5,161,768 | 11/1992 | Sarabin | 248/125 X |

FOREIGN PATENT DOCUMENTS 2-78483  12/1988  Japan .

OTHER PUBLICATIONS

Minoura Co., Ltd, Product Catalogue, Oct. 1992.

*Primary Examiner*—Ramon O. Ramirez
*Attorney, Agent, or Firm*—Hickman & Beyer

[57] ABSTRACT

A collapsible bicycle stand that is supported in the upright position when in use. The stand includes a telescopeable and length-adjustable post. The post is extended when the stand is in use, and shortened when the stand is not in use. Support arms are located at the upper end of the post. The support arms are pivotally rotatable between a bicycle holding or retaining position, when the stand is in use, and a parallel position with respect to the post, when the stand is not in use. At least a pair of legs are connected to the bottom portion of the post. These legs are pivotally movable between a first position where the legs are opened in opposite directions with respect to the post, and parallel with respect to the floor when the stand is in use, and a second position where the legs are folded in parallel with respect to the post, when the stand is not in use.

15 Claims, 9 Drawing Sheets

BICYCLE STAND

BACKGROUND OF THE INVENTION

1. Field of the Invention

The present invention relates generally to a bicycle stand. More particularly, it relates to a collapsible bicycle stand for supporting a bicycle.

2. Description of the Related Art

Recently, participating in bicycle racing as a hobby is gaining wide popularity. Therefore, it is the trend to design multi-functional high quality bicycles. In bicycle shops, display stands are used for displaying bicycles for emphasizing their aesthetic appearance. Furthermore, these display stands could be used to perform maintenance works on the bicycles. Many hobby type (specialized) bicycles are no longer provided with self-stands. Bicycle stands can also be used as a temporary parking device when the bicycle is stored.

Japanese Unexamined Utility Model Publication No. 2-78483 discloses a stand of this type for bicycle maintenance as illustrated in FIG. 12. A pair of legs 80 are pivotally connected to each other at the middle portions thereof, and are closed when the stand is not in use. Therefore, the stand can be stored in narrow spaces. The pair of legs 80 are opened to form an X-configuration, in order to support a bicycle 90, when the stand is in use. The bicycle 90 is elevated in order to perform maintenance works. Therefore, the legs 80 are relatively long, and do not become more compact lengthwise. Consequently, it is inconvenient to carry the stand even when the legs 80 are closed. Furthermore, when maintenance is performed on the bicycle 90, a fork blade 91 and a crank axle 92 are captured by corresponding top portions of the legs 80. In order to perform maintenance, the front wheel of the bicycle 90 should be removed. Thus, maintenance becomes rather complicated.

To overcome this shortcoming, a bicycle work stand has been proposed, as illustrated in FIG. 13. This work stand has tripod legs 86 which are connected to the lower portion of a post 85. The legs 86 can be folded for easy transport when the stand is not in use. When the stand is in use, the legs 86 are opened to support a down tube of the bicycle by supporting means disposed at the upper end of a post 85. Therefore, this work stand is compact and transportable. Furthermore, the stand permits to support the bicycle without taking its front wheel off for easy mounting.

On the contrary, in the stand described above, the lower end portion of the post 85 is supported by the tripod legs well above the floor level. Therefore, the stand is rather unstable and is not suitable for long term displays.

SUMMARY OF THE INVENTION

Accordingly, it is a primary object of the present invention to provide a bicycle stand which can securely support the bicycle and be very transportable.

To achieve the foregoing and other objects in accordance with the purpose of the present invention, there is disclosed a collapsible bicycle stand, which includes a telescopeable and length-adjustable post. The post is extended when the stand is in use, and shortened when the stand is not in use. Support arms are mounted at the upper end of the post. The support arms are pivotally rotatable between the bicycle holding position, when the stand is in use, and a parallel position with respect to the post, when the stand is not in use. At least a pair of legs are connected to the bottom portion of the post. These legs are pivotally movable between the position where the legs are opened in opposite directions with respect to the post, and parallel with respect to the floor when the stand is in use, and the position where the legs are folded in parallel with respect to the post, when the stand is not in use.

According to the present invention, the stand can securely hold the bicycle because the legs are fully opened parallel to the floor so that the post is securely supported at almost the floor level, when the stand is in use. The support arms and legs can be folded in parallel to the post and the length of the post itself is adjustable. Therefore, the stand is folded to become very compact for easy transport when it is not in use.

BRIEF DESCRIPTION OF THE DRAWINGS

The features of the present invention that are believed to be novel are set forth with particularity in the appended claims The invention, together the objects and advantages thereof, may best understood by reference to the following description of the presently preferred embodiments, together with the accompanying drawings, in which:

FIGS. 1 through 11 illustrate an embodiment of the present invention, wherein:

FIG. 1 is a front view illustrating a bicycle mounted on a bicycle stand for maintenance;

FIG. 2 is a front view illustrating the bicycle mounted on the bicycle stand for display or temporary parking;

FIG. 3 is a plan view of the legs of the bicycle stand;

FIG. 4 is an enlarged bottom view of a part of the stand in FIG. 3;

FIG. 5 is a greatly enlarged view of part of the legs used in the stand;

FIG. 6 is a greatly enlarged view illustrating the support arms mounted at the upper end of the post;

FIG. 7 is a greatly enlarged front view of a bracket shown in FIG. 6;

FIG. 8 shows a receiving member attached in the first arm of FIG. 1, seen from the axial direction of the support arm;

FIG. 9 is a front view of the stand illustrating both support arms in the folded position;

FIG. 10 is a front view illustrating the legs of the stand of FIG. 9 in the folded position;

FIG. 11 shows the collapsed bicycle stand stored in a bag;

DETAILED DESCRIPTION OF THE PREFERRED EMBODIMENT

A preferred embodiment of a collapsible bicycle stand according to the present invention will now be described referring to FIGS. 1 through 11.

Figure 1:
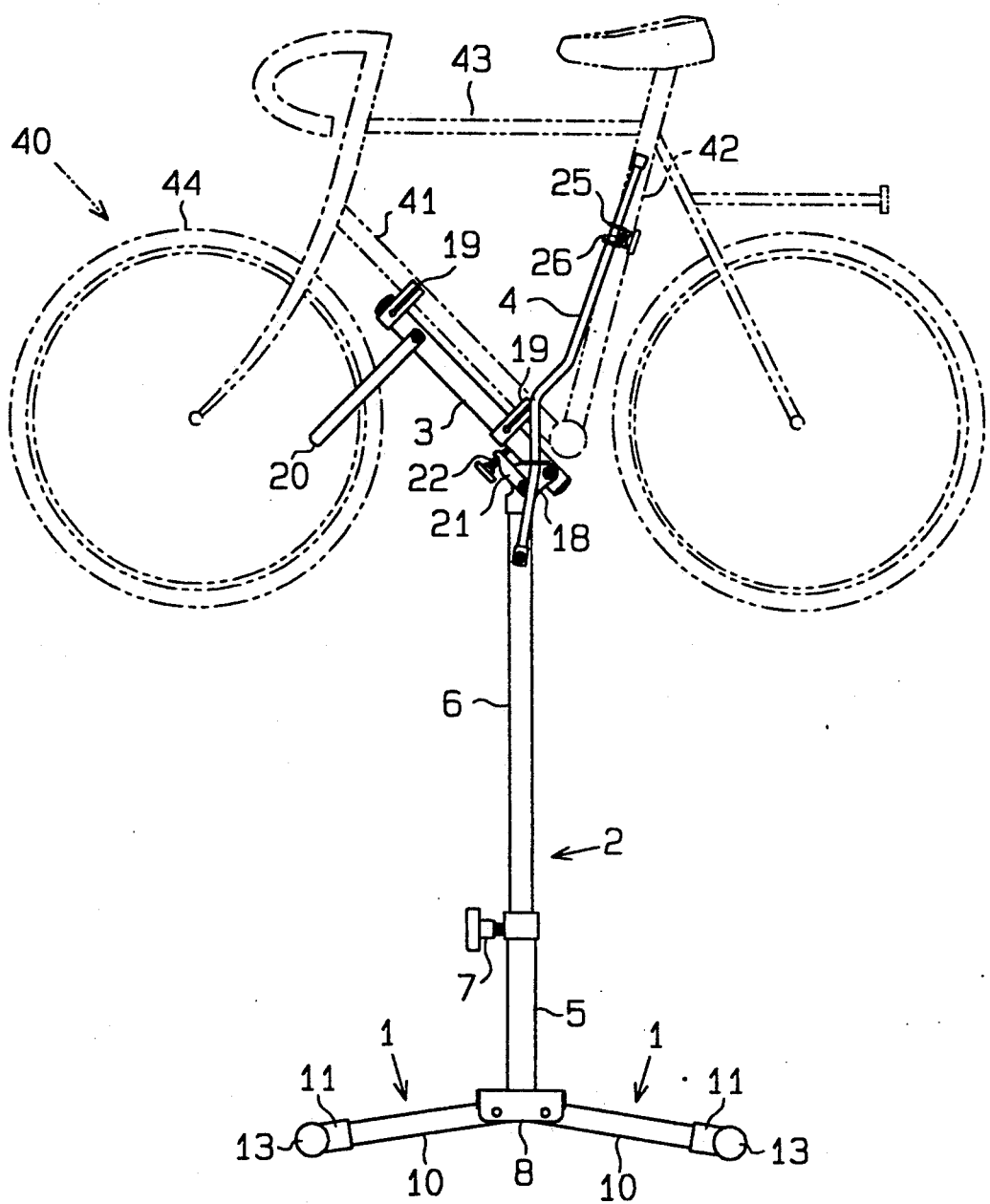
Figure 2:
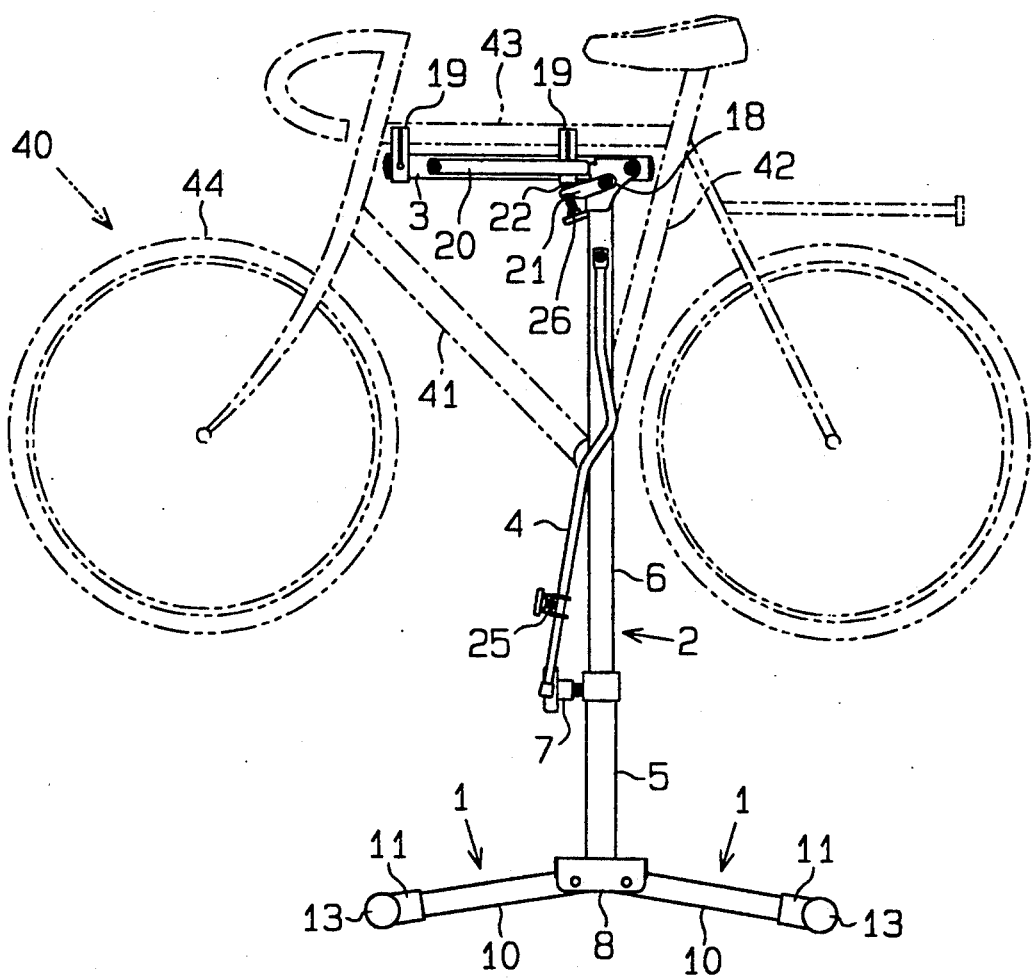
Figure 3:
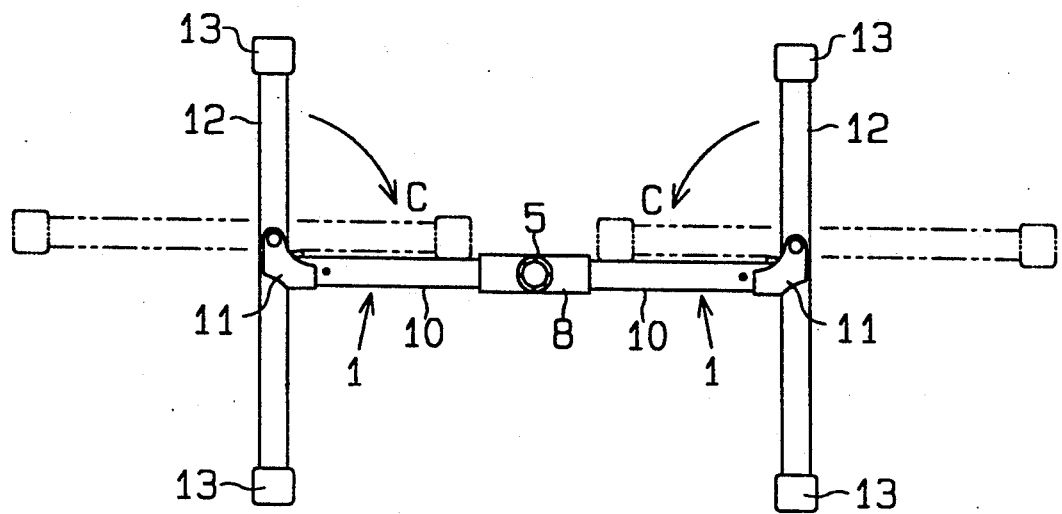
Figure 11:
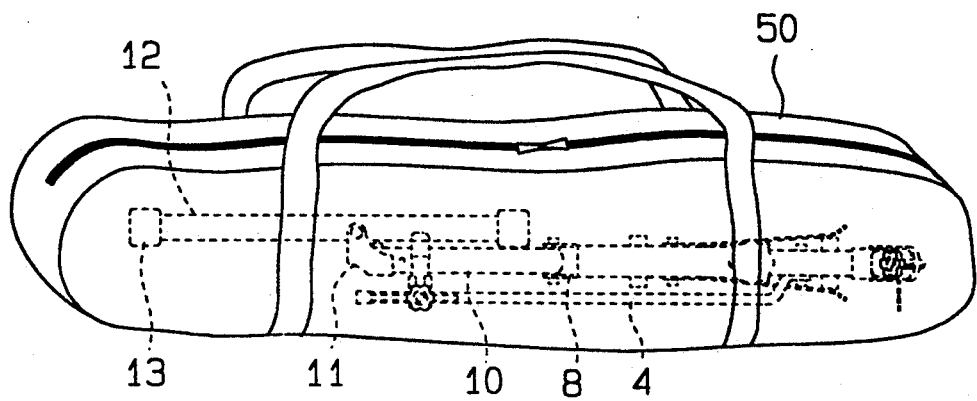
Figure 12:
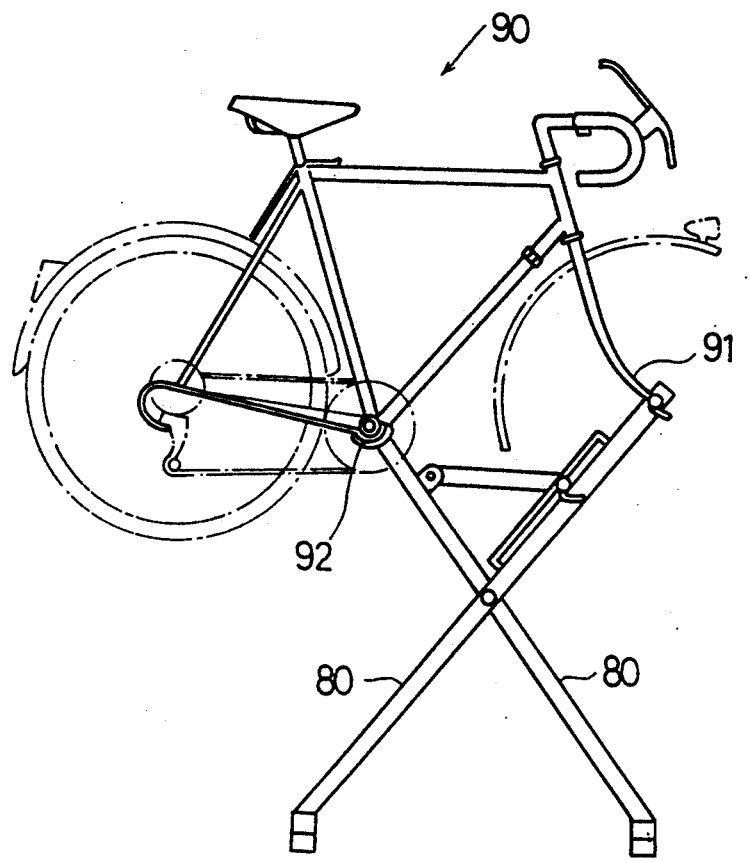
FIG. 12 is a front view of a conventional bicycle stand.
Figure 13:
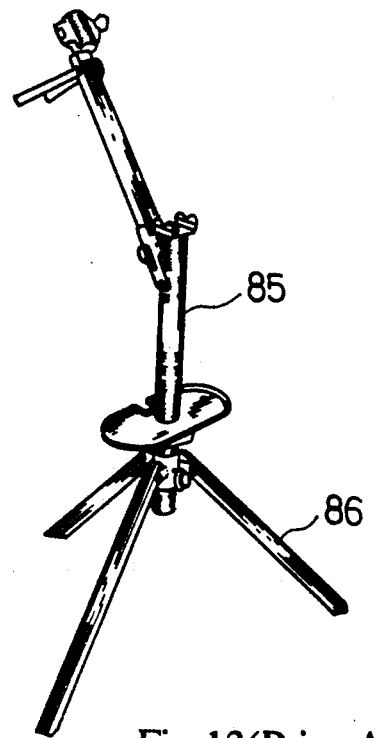
FIG. 13 is a front view of another conventional bicycle stand.

As shown in FIG. 1, the bicycle stand holds a bicycle 40 for maintenance. As shown in FIG. 2, the bicycle stand is also used for display, and for temporarily parking the bicycle 40. The stand is constructed of tubular light-weight metal material. When the stand is not in use, the collapsed stand can be stored in a bag 50 or in confined spaces, as shown in FIG. 11.

As shown in FIG. 1, the bicycle stand includes a post 2 which is substantially supported in an upright direction, by a pair of legs 1, and a first and second support arms 3 and 4, which are connected at the upper portion of the post 2. The post 2 includes an outer tube 5, and an inner tube 6 which telescopes upwardly, inside the outer tube 5. The entire length of the post 2 can be adjusted by setting a proper telescoped length of the inner tube 6 with respect to the outer tube 5, and by tightening a lock 7.

Figure 4:
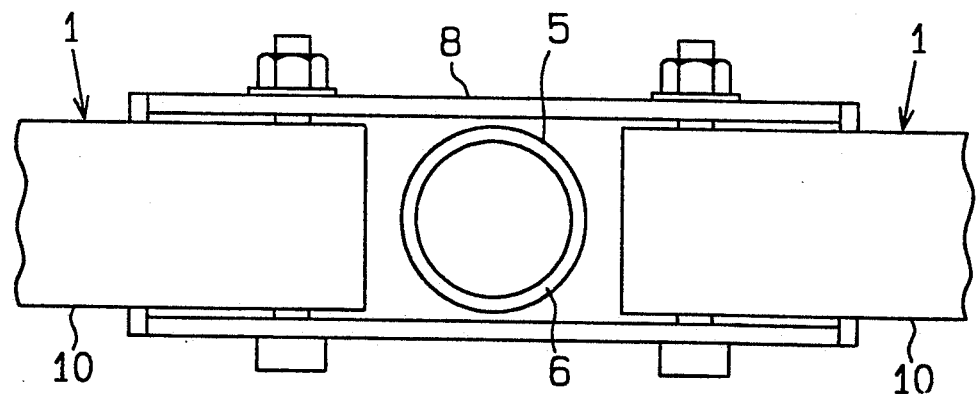

A connecting member 8 is secured to the bottom portion of the outer tube 5. The connecting member 8 is formed by folding a plate into a generally U-shaped channel, with its open end facing downwardly. Each leg 1 is pivotally connected to each of the sides of the connecting member 8. As shown in FIG. 4, the distal ends of both legs 1, which are disposed within the inner side of the connecting member 8 and facing each other, are separated by a distance that is slightly longer than the diameter of the inner tube 6. The inner tube 6 is movable within the outer tube 5.

More specifically, the legs 1 include cross bars 10 which are connected to the connecting member 8, and to the base bars 12 The base bars 12 are connected to the distal portion of the corresponding cross bars 10, via a hinge 11.

When the stand is in use, each base bar 12 is pivotally rotated in a perpendicular position with respect to the corresponding cross bar 10. Therefore, each leg 1 is generally T-shaped, and is substantially parallel to the floor when in use. In this state, the legs 1 securely support the post 2 and the entire weight of the bicycle 40, at almost the floor level. Both ends of each base bars 13 are covered with rigid synthetic resin pads 13, for preventing slippage. The base bars 12 do not contact the floor directly because of these pads 13, and consequently, damage or scratch to the legs is prevented. Furthermore, the post 2 is securely and stably supported at four points of the legs 1.

Figure 5:
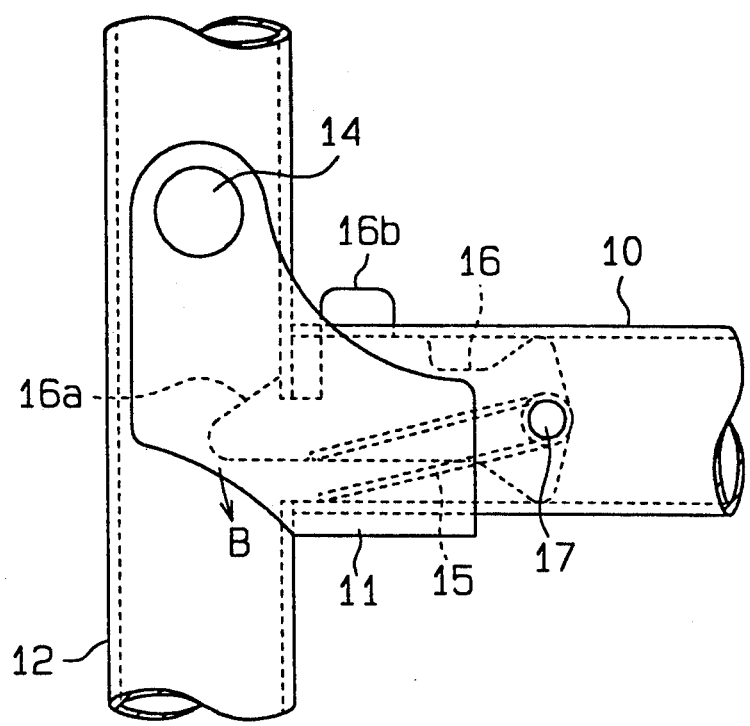

As shown in FIG. 5, a stopper 16 is urged by a U-shaped spring disposed at the outer distal portion within the corresponding cross bar 10. The stopper 16 includes a hook 16a which is formed at the distal end portion thereof, and which is pivotally rotatable with respect to a pin 17. The hook 16a protrudes from the cross bar 10 into the base bar 12, and engages its inner surface, causing the base bar 12 to be securely locked to the corresponding cross bar 10 in the perpendicular direction.

Therefore, the base bars 12 would not pivotally rotate, even when unsuspected force is applied thereto. The stopper 16 is caused to rotate in the direction of the arrow B, when a projection 16b formed on the side edge of the stopper 16 is pushed in. As a result, the engagement between the hook 16a and the base bar 12 is released. As further illustrated in FIG. 3, the base bars 12 are pivotally rotated in the directions of the arrows C, and are folded in the parallel position with respect to the cross bar 10, as shown by the broken lines.

Figure 10:
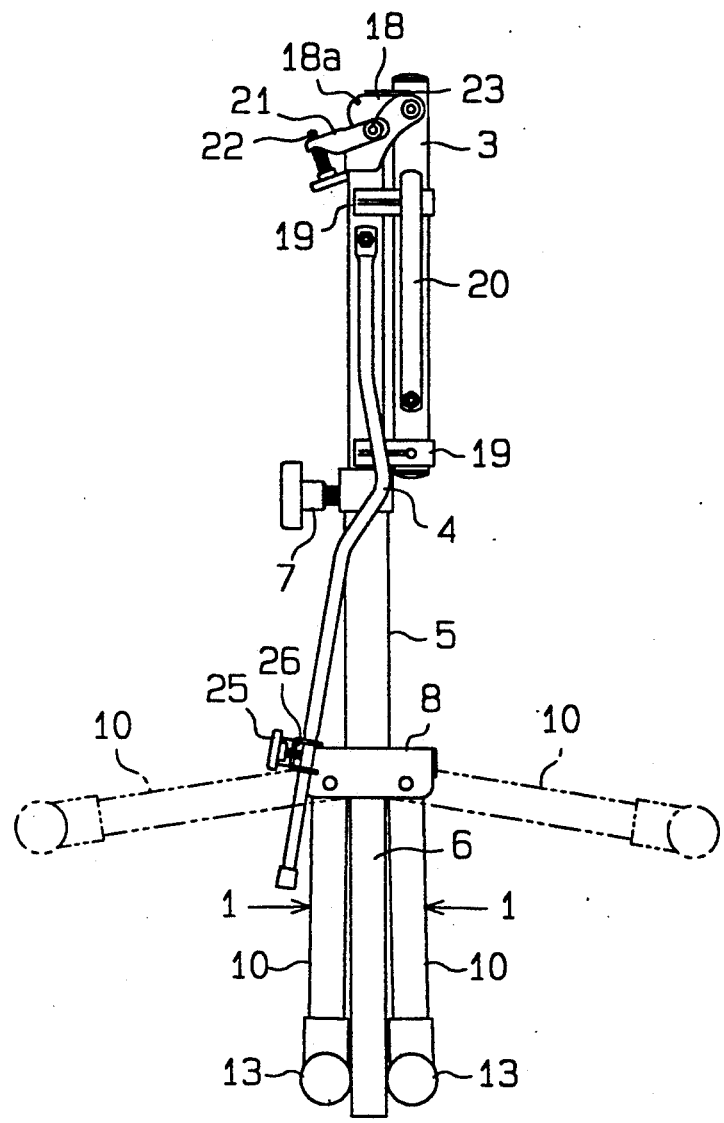

The cross bars 10 are opened when the stand is in use, as shown in FIGS. 1 through 4. When the stand is not in use, the cross bars 10 are folded in the parallel position with respect to the post 2, as shown in FIG. 10. When the stand is stored in the bag 50, the cross bars 10 and the base bars 12 are folded in the parallel position with respect to the post 2, as shown in FIG. 11. Therefore, the present stand can be easily stored in limited storage spaces.

Figure 6:
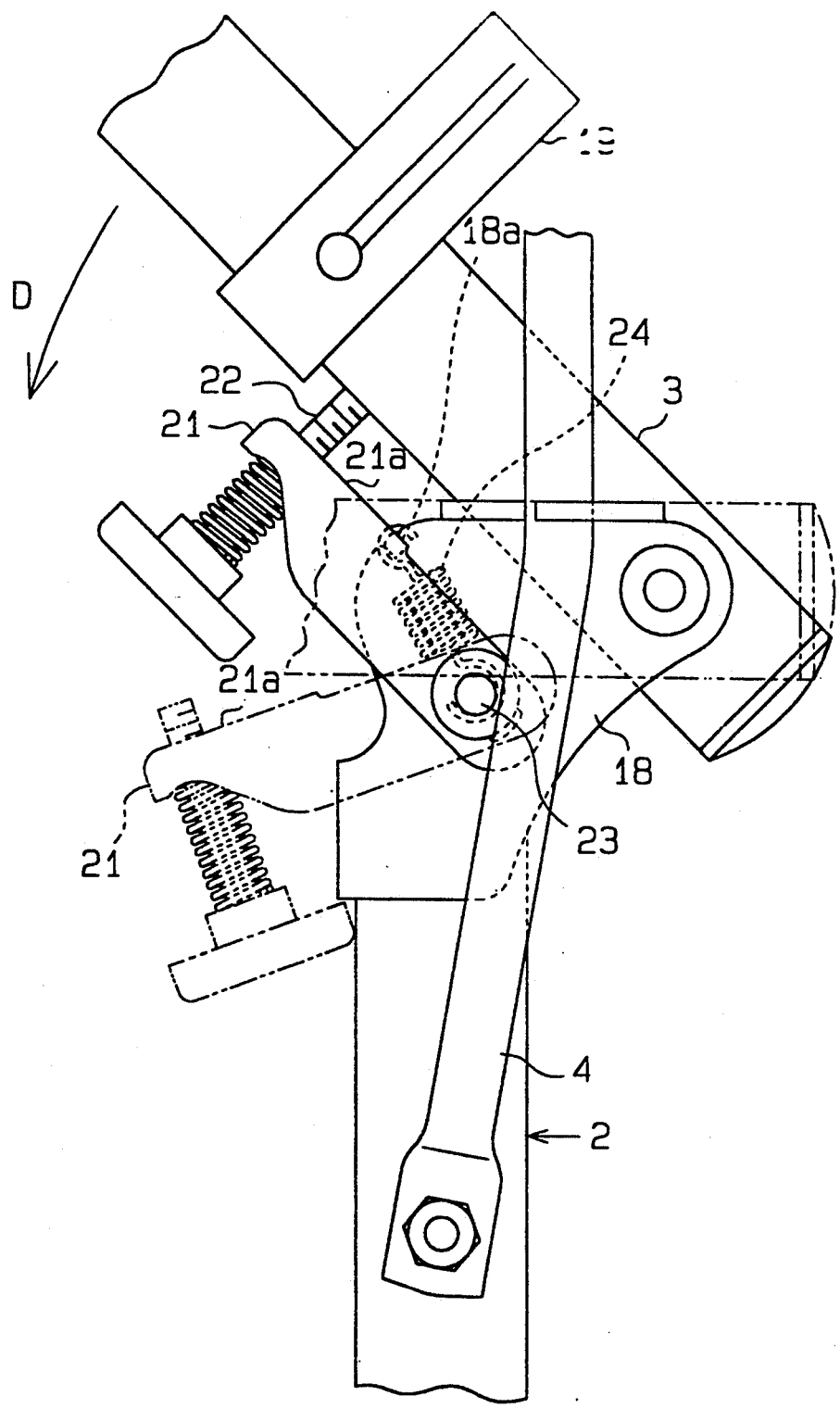
Figure 7:
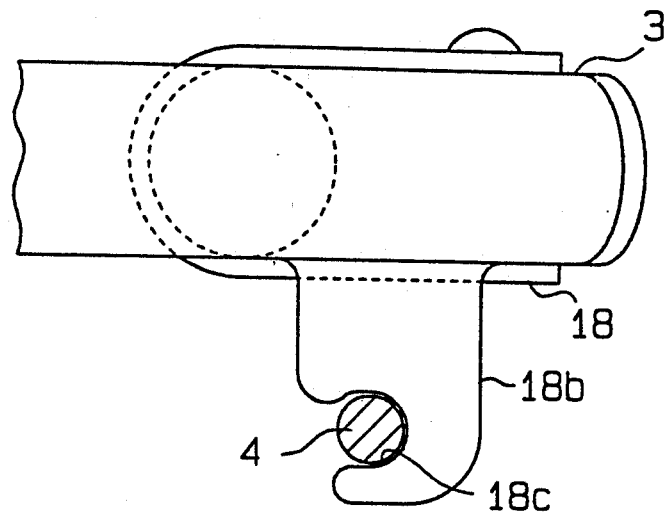
Figure 8:
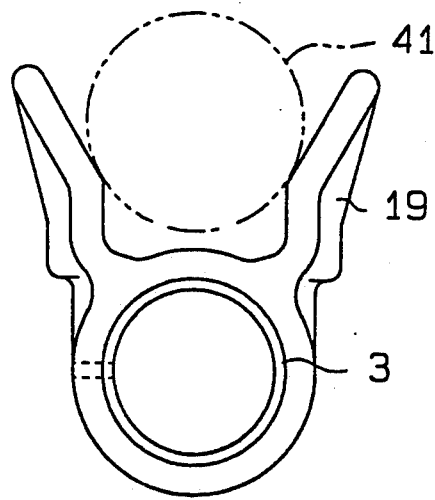
Figure 9:
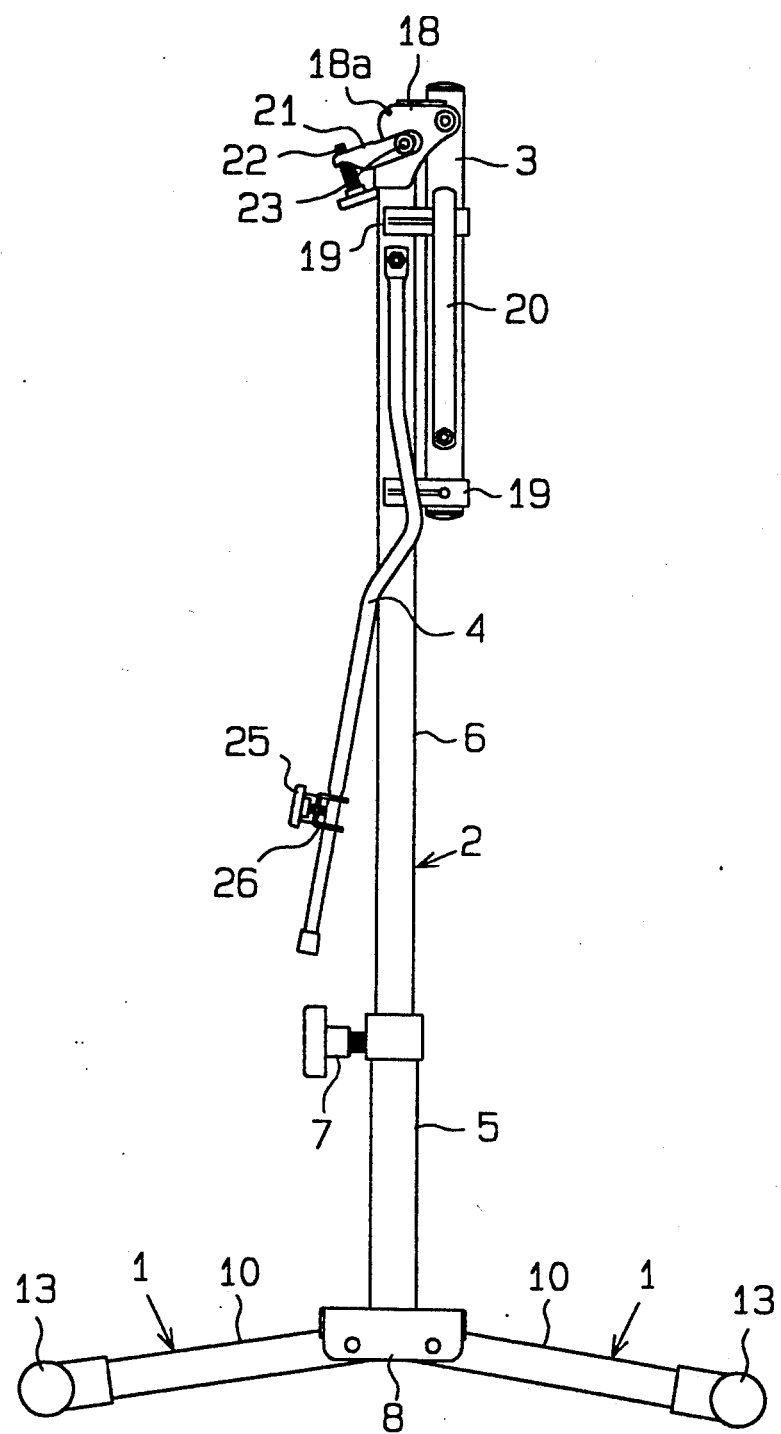

A bracket 18 is disposed at the top portion of the post 2 as illustrated in FIGS. 1, 2, 6 and 7. A notch 18c is formed in a wing 18b of the bracket as shown in FIG. 7. The first support arm 3 is freely and rotatably connected to the bracket 18. As further shown in FIG. 8, V-shaped receiving members 19 are non-movably disposed at the base portion and the outer end portion of the first support arm 3. The down tube 41 of the bicycle 40 is captured by the receiving members 19, when maintenance is performed on the bicycle 40. The first support arm 3 is folded in the parallel position with respect to the post 2, as shown in FIGS. 9, 10 and 11. Furthermore, the arm 3 can not move freely because both receiving members 19 capture the inner tube 6.

A rotational plate 21 is pivotally supported by the bracket 18 within predetermined angles. The arm 3 is supported upwardly by a screw 22 which is inserted through the rotational plate 21. The angle of the arm 3 can be precisely adjusted by manipulating the screw 22. A proximal end, of a plate body 21a of the rotational plate 21, engages a slot 18a formed in the bracket 18. The plate body 21a can not be disengaged from the slot 18a by the action of a spring 24, which is installed between the proximal end of the plate body 21a and a center axle 23. Therefore, the rotational plate 21 is kept in the inclined position, as shown in FIG. 1. Furthermore, the arm 3 can be positioned parallel to the down tube 41 of the bicycle 40, by precisely adjusting the screw 22.

As shown in FIG. 6, the plate body 21a can be disengaged from the slot 18a, by pulling the rotational plate 21 against the urging force of the spring. The rotational plate 21 is pivotally rotated around the central axle 23 in the direction of the arrow D, and stops its rotation at the position indicated by the broken line.

Therefore, the arm 3 is adjusted into a horizontal position, for display or temporary parking, as shown in FIG. 2. A top bar 43 of the bicycle 40 is captured by the corresponding receiving members 19, when the bicycle 40 is in the display or temporary parking position.

As shown in FIG. 1, 2, 9, 10 and 11, a pair of clamps 20 are pivotally secured to the arm 3 by means of screws, and are oppositely disposed relative to the arm 3, between the receiving members 19 of the first support arm 3. The clamps 20 are made of a pair of narrow elongated plates. The clamps 20 are pivotally rotatable only when a significant force is applied thereto. As shown in FIG. 1, the clamps 20 are rotated to a perpendicular position, with respect to the first support arm 3, in order to clamp the front wheel 44 of the bicycle 40, for preventing the handle from moving freely, when maintenance is being performed on the bicycle 40. When the bicycle 40 is supported on the stand, as shown in FIG. 2, or when it is temporarily parked thereon, or when it is stored in the bag 50 as shown in FIGS. 9, 10, and 11, the clamps 20 are folded parallel to the first arm 3.

The second support arm 4 is pivotally fitted at the upper portion of the inner tube 6 of the post 2. The second arm 4 is folded parallel to the post 2, when the stand is in use, as shown in FIGS. 2, 9, 10 and 11. When the bicycle 40 is supported on the stand for maintenance, the second arm 4 is rotated to the upright position, as shown in FIG. 1.

As shown in FIG. 7, the second arm 4 engages the notch 18c formed in the wing 18b of the bracket 18, so as to prevent its further rotation. The receiving member 25 is attached to the second arm 4 by means of the screw 26. The receiving member 25 is movable within the predetermined distance, at the end portion of the second arm 4, by loosening the screw 26. When the bicycle 40 is supported on the stand for maintenance, as shown in FIG. 1, a seat tube 42 of the bicycle 40 is captured by the receiving member 25.

The operation of the stand which is constructed in the above-mentioned manner will now be described.

When the bicycle 40 is supported on the stand for maintenance as shown in FIG. 1, the first support arm 3 is angularly supported by the upper portion of the post 2. Further, the second support arm 4 is uprightly supported. The down tube 41 and the seat tube 42 of the bicycle are securely captured by the receiving members 19 and 25 of the support arms 3 and 4, respectively. The front wheel 44 is supported by the clamps 20. Therefore, the bicycle 40 is securely supported so that maintenance can be performed from underneath At this time, the cross bars 10 of both legs 1 are opened generally parallel to the floor. The base bars 12 contact the floor, via the pads 13. Therefore, the bottom portion of the post 2, to which the weight of the bicycle is applied, is supported at about the ground level, so that the bicycle stand is kept in a totally balanced condition. Both tubes 41 and 42 are supported above the upper portion of the stand. Thus, the bicycle 40 is elevated so that maintenance can be easily performed thereon.

When the stand is used for display or temporary parking, a top tube 43 of the bicycle 40 is supported by the support arm 3, which extends horizontally. Therefore, the bicycle 40 is supported at the rather lower position with respect to the stand, so that the bicycle 40 is stabilized for longer display. The entire legs 1 are generally parallel to the floor, so that the stand is securely supported in a totally balanced condition.

When the stand which is in use is to be folded down, as shown in FIG. 10, both arms 3 and 4 are pivoted to become vertically parallel to the post 2. Thereafter, the inner tube 6 of the post 2 is pushed into the outer tube 5, and protrudes out of the outer tube 5 through the connecting member 8. The legs 1 are folded to become parallel to the post 2, and the entire length of the post 2 is shortened.

Therefore, the stand is compactly folded for storage in narrow spaces. The stand is easily transportable when it is folded down and stored in the bag 50 or similar carrying means.

Although only one embodiment of the present invention has been described herein, it should be apparent to those skilled in the art that the present invention may be embodied in many other specific forms without departing from the spirit or scope of the invention.

For example, each leg could be Y-shaped, or the legs can be formed by only four cross bars, and the base bars 12 are eliminated.

Therefore, the present examples and embodiments are to be considered as illustrative and not restrictive and the invention is not to be limited to the details giving herein, but may be modified within the scope of the appended claims.

What is claimed is:

1. A collapsible bicycle stand for supporting a bicycle on a surface, the stand comprising:
 a telescoping post;
 support means for supporting the bicycle, the support means being mounted on an upper end of said post and pivotally rotatable between a support position and a collapsed position;
 at least a pair of legs connected to a bottom portion of said post, wherein each leg includes a cross bar which is pivotally connected to the bottom end of said post, and a base bar pivotally connected to said cross bar, such that said base bar is pivotally movable independently of said post between a generally parallel position, and a generally perpendicular position with respect to said cross bar; and
 said legs being pivotally movable between a first position wherein said legs are almost parallel to the floor, for holding the bottom portion of said post when the stand is in use, and a second position wherein said legs are folded and are generally parallel to said post, when the stand is not in use.

2. A bicycle stand according to claim 1, wherein said support position includes a first arm support position for supporting a down tube of the bicycle and a second arm support position for supporting a top tube of the bicycle.

3. The bicycle stand according to claim 1, wherein each leg includes padding means composed of rigid synthetic resin, and mounted on both ends of said base bar.

4. The bicycle stand according to claim 1, wherein each leg further includes lock means for fixing said base bar to said perpendicular position with respect to said cross bar.

5. A collapsible bicycle stand for supporting a bicycle on a surface, the stand comprising:
 a telescoping post;
 support means for supporting the bicycle, the support means being mounted on an upper end of said post and pivotally rotatable between a support position and a collapsed position, said support means including a first support arm selectively placed in one of a multiplicity of positions including a plurality of support position; and
 at least a pair of legs connected to a bottom portion of said post, said legs being pivotally movable between a first position wherein said legs are almost parallel to the floor for supporting the bottom portion of said post closer to the floor when the stand is in use, and a second position wherein said legs are folded and are generally parallel to said post, when the stand is not in use.

6. The bicycle stand according to claim 5, wherein said multiplicity of positions includes a first arm support position for supporting a down tube of the bicycle, a second arm support position for supporting a top tube of the bicycle, and a collapsed position generally parallel to said post; and
 wherein said support means further includes a second support arm for supporting a seat tube, when said first support arm is in said first arm support position.

7. The bicycle stand according to claim 6, wherein said support means further includes at least one V-shaped first receiving member fixedly secured to said first support arm, such that said first receiving member receives the down tube of the bicycle when the stand is in use; and
 a second receiving member movably secured to said second support arm.

8. A collapsible bicycle stand for supporting a bicycle on a surface, the stand comprising:
 a telescoping post;
 support means for supporting the bicycle, the support means being mounted on an upper end of said post, and pivotally rotatable between a support position and a collapsed position;

at least a pair of legs connected to a bottom portion of said post, each leg including a cross bar which is rotatably connected to the bottom end of said post and a base bar rotatably connected to said cross bar, such that said base bar is pivotally movable between a generally parallel position, and a generally perpendicular position with respect to said cross bar and said legs being pivotally movable between a first position wherein said legs are almost parallel to the floor, for holding the bottom portion of said post closer to the floor when the stand is in use, and a second position wherein said legs are folded and are generally parallel to said post, when the stand is not in use; and lock means for fixing said base bar to said perpendicular position with respect to said cross bar, wherein said lock means includes a stopper disposed at the outer end of said cross bar, and wherein said stopper includes a hook which protrudes into said base bar for engaging the inner surface of said base bar.

9. A collapsible bicycle stand for supporting a bicycle on a surface such as a floor, the stand comprising:
   a telescoping post;
   support means for supporting the bicycle, the support means being mounted on an upper end of said post, and pivotally rotatable between a first support position, a second support position and a collapsed position;
   a pair of cross bars connected to a bottom portion of said post, said cross bars being pivotally movable between a first position, wherein said cross bars are almost parallel to the floor, and a second position, wherein said cross bars are folded and are generally parallel to said post;
   a pair of base bars rotatably connected to said cross bars, said base bars being pivotally movable independently of said post between a generally parallel position and a generally perpendicular position with respect to said cross bars;
   whereby, when the stand is in use, said cross bars and base bars are almost parallel with respect to the floor, for holding the bottom portion of said post closer to the floor; and
   whereby, when the stand is not in use, said cross bars are folded and are generally parallel to said post, and said base bars are folded and are generally parallel to said cross bars.

10. The bicycle stand according to claim 9, wherein the stand includes padding means composed of rigid synthetic resin, and mounted on both ends of said base bar.

11. The bicycle stand according to claim 9, wherein the stand further includes lock means for fixing the base bar to said perpendicular position with respect to said cross bar.

12. A collapsible bicycle stand for supporting a bicycle on a surface, the stand comprising:
   a telescoping post;
   support means for supporting the bicycle, the support means being mounted on an upper end of said post, and pivotally rotatable between a first support position and a second support position, wherein said support means includes a first support arm selectively placed in one of three positions, and wherein said positions include a first support arm position for supporting the down tube of the bicycle, a second support arm position for supporting a top tube of the bicycle, and a collapsed position generally parallel to said post;
   a pair of cross bars connected to a bottom portion of said post, said cross bars being pivotally movable between a first position, wherein said cross bars are almost parallel to the floor, and a second position, wherein said cross bars are folded and are generally parallel to said post;
   a pair of base bars rotatably connected to said cross bars, said base bars being pivotally movable between a generally parallel position and a generally perpendicular position with respect to said cross bars;
   whereby, when the stand is in use, said cross bars and base bars are almost parallel with respect to the floor, for holding the bottom portion of said post closer to the floor; and
   whereby, when the stand is not in use, said cross bars are folded and are generally parallel to said post, and said base bars are folded and are generally parallel to said cross bars.

13. The bicycle stand according to claim 12, wherein said support means further includes a second support arm for supporting a seat tube, when said first support arm is in said first arm support position.

14. A collapsible bicycle stand for supporting a bicycle on a surface such as a floor, the stand comprising:
   a telescoping post;
   support means for supporting the bicycle, the support means being mounted on an upper end of said post, and pivotally rotatable between a first support position and a second support position;
   a pair of cross bars connected to a bottom portion of said post, said cross bars being pivotally movable between a first position, wherein said cross bars are almost parallel to the floor, and a second position, wherein said cross bars are folded and are generally parallel to said post;
   a pair of base bars rotatably connected to said cross bars, said base bars being pivotally movable between a generally parallel position and a generally perpendicular position with respect to said cross bars;
   lock means for mixing the base bar to said perpendicular position with respect to said cross bar, wherein said lock means includes a stopper disposed at the outer end of said cross bar, and wherein said stopper includes a hook which protrudes into said base bar for engaging the inner surface of said base bar;
   whereby, when the stand is in use, said cross bars and base bars are almost parallel with respect to the floor, for holding the bottom portion of said post closer to the floor; and
   whereby, when the stand is not in use, said cross bars are folded and are generally parallel to said post, and said base bars are folded and are generally parallel to said cross bars.

15. A collapsible bicycle stand for supporting a bicycle on a surface such as a floor, the stand comprising:
   a telescoping post;
   first support arm for supporting the bicycle, being mounted on an upper end of said post which is selectively placed in one of three positions, wherein said positions include a first arm support position for supporting a down tube of the bicycle, a second arm support position for supporting a top tube of the bicycle, and a collapsed position being generally parallel to said post;

second support arm mounted on the upper end of said post, for supporting a seat tube, when said first support arm is in said first arm support position;

a pair of cross bars connected to a bottom portion of said post, said cross bars being pivotally movable between a first position, wherein said cross bars are almost parallel to the floor, and a second position, wherein said cross bars are folded and are parallel to said post;

a pair of base bars rotatably connected to said cross bars, said base bars being pivotally movable between a generally parallel position and a generally perpendicular position with respect to said cross bars;

whereby, when the stand is in use, said cross bars and base bar are almost parallel with respect to the floor, for holding the bottom portion of said post closer to the floor; and whereby, when the stand is not in use, said cross bars are folded and are generally parallel to said post, and said base bars are folded and are generally parallel to said cross bars.

* * * * *